United States Patent Office 3,229,071
Patented Jan. 11, 1966

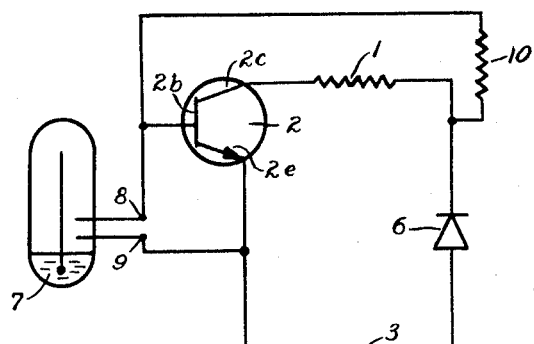
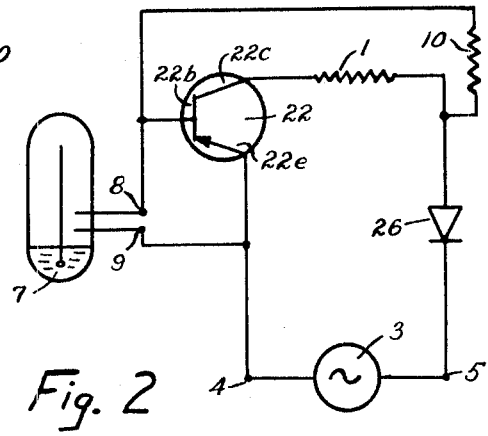
Fig. 1  Fig. 2
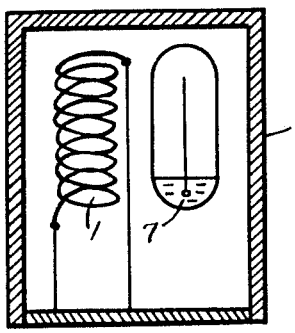
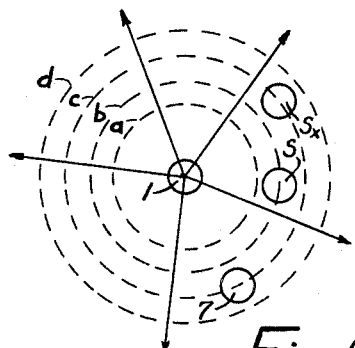
Fig. 3  Fig. 4
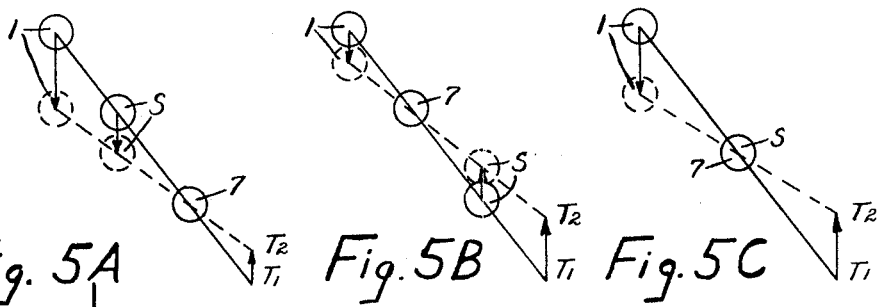
Fig. 5A  Fig. 5B  Fig. 5C
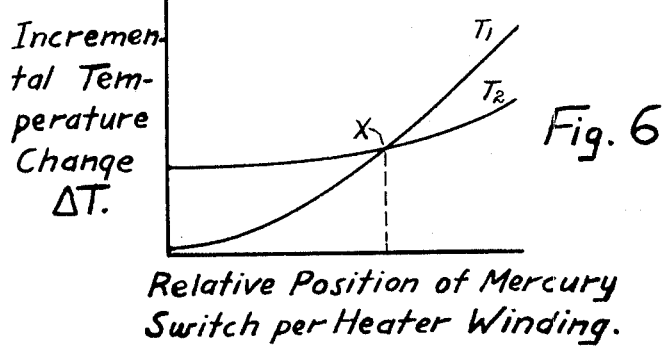
Fig. 6
INVENTORS
Dimitri Wisz
Jonas M. Shapiro
BY Daniel Jay Tick
Alfred E. Miller
Attorneys

3,229,071
TRANSISTORIZED TEMPERATURE CONTROL
CIRCUIT ARRANGEMENT
Dimitri Wisz and Jonas M. Shapiro, Stamford, Conn.,
assignors to Manson Laboratories, Incorporated, Stamford, Conn., a corporation of Connecticut
Filed Mar. 17, 1960, Ser. No. 15,625
7 Claims. (Cl. 219—501)

The present invention relates to a temperature control circuit arrangement. More particularly, the invention relates to a transistorized temperature control circuit arrangement for an oven.

In accordance with the present invention, the temperature control circuit arrangement utilizes a mercury switch unit in an oven and a transistor to maintain the oven temperature constant with great precision. The circuit is so arranged that when the switch unit closes, due to the oven temperature exceeding a predetermined level, the transistor becomes nonconductive and no current flows through the oven heating winding so that no further heat is produced, and when the switch unit opens, due to the oven temperature being less than a predetermined level, the transistor becomes conductive and current flows through the heating winding so that heat is produced in the oven.

The circuit arrangement of the present invention utilizes a small alternating current voltage supply and avoids filters and high power consumption, and because it is transistorized, it is compact, rugged and light weight.

The principal object of the present invention is the provision of a circuit arrangement for controlling temperature with great precision.

An object of the present invention is the provision of a transistorized circuit arrangement for controlling temperature with great precision.

Another object of the present invention is the provision of a circuit arrangement for controlling temperature within 0.01 degree centigrade at a fixed ambient.

Another object of the present invention is the provision of a circuit arrangement for controlling temperature with great reliability.

Another object of the present invention is the provision of a circuit arrangement of relatively long life for controlling temperature with great precision.

Another object of the present invention is the provision of a circuit arrangement of relative immunity to vibration effects for controlling temperature with great precision.

Another object of the present invention is the provision of a circuit arrangement having low power consumption for controlling temperature with great precision.

Another object of the present invention is the provision of a relatively simple circuit arrangement of compact size and rugged light weight construction for controlling temperature with great precision.

Another object of the present invention is the provision of a circuit arrangement having a quiet operating characteristic for controlling temperature with great precision.

Still another object of the present invention is the provision of a circuit arrangement of low cost for controlling temperature with great precision.

These and other objects and features of the invention will be apparent from a consideration of the following detailed description taken in connection with the accompanying drawing, wherein:

FIG. 1 is a schematic diagram of an embodiment of the circuit arrangement of the present invention;

FIG. 2 is a schematic diagram of a modification of the embodiment of FIG. 1;

FIG. 3 is a schematic diagram, partly in section, illustrating the physical positions of some of the components of FIGS. 1 and 2;

FIG. 4 is a schematic representation of heat flow from a heater 1 and equal temperature shells surrounding the heater;

FIGS. 5A, 5B and 5C are schematic representations of gradient conditions, with change of ambient temperature for various relative positions of heater 1, controlled space S, and mercury switch 7; and FIG. 6 is a graphical presentation of the incremental temperature change $\Delta T$ versus relative position of the mercury switch 7 with respect to the heater winding 1.

In FIG. 1, a heater winding 1 is of a type which produces heat in response to a current flow therethrough. The heater winding 1 is adapted to heat an oven (not shown in FIG. 1) of any suitable type, such as, for example, a crystal oven. The heater winding 1 is connected to the collector electrode $2c$ of a transistor 2 having an emitter electrode $2e$, a collector electrode $2c$ and a base electrode $2b$. The emitter and collector electrodes provide an emitter-collector path $2ec$ through the transistor 2, the emitter and base electrodes provide an emitter-base path $2eb$ therethrough and the collector and base electrodes provide a collector-base path $2cb$ therethrough.

A source of supply voltage 3 provides a substantially small alternating current voltage to the series circuit arrangement of the heater winding 1 and the emitter-collector path $2ec$ of the transistor 2. One terminal 4 of the supply source 3 is connected to the emitter electrode $2e$ of the transistor 2 and the other terminal 5 of said supply source is connected to the collector electrode $2c$ of said transistor through a diode 6 and the heater winding 1. The diode 6 and the heater winding 1 are connected in series circuit arrangement between the terminal 5 and the collector electrode $2c$. If the entire circuit arrangement were to consist only of the heater winding 1, the transistor 2 and the supply voltage source 3, assuming that the electrodes were to be properly biased and that said transistor is of the NPN type, said transistor would be conductive upon the voltage at the emitter electrode being negative with respect to that at the collector electrode and that at the base electrode and the voltage at the collector electrode being positive with respect to that at the base electrode and the heater winding 1 would produce heat due to the current flow therethrough. In other words, the NPN type transistor conducts when there is a positive voltage from the collector to base and a negative voltage from the emitter to base.

A mercury switch unit 7 is of a type which conducts current in its ON position when the oven temperature exceeds a predetermined value and does not conduct current in its OFF position when the oven temperature is less than said predetermined value. The mercury switch unit 7 is adapted to be positioned in the oven (not shown in FIG. 1) in which the heater winding 1 is positioned. It is of a type which incorporates a highly pressurized inert gas above the mercury column to eliminate the possibility of mercury separation and is mounted on a built-in shock-mount to withstand severe shock and vibration. One terminal 8 of the mercury switch unit 7 is connected to the base electrode $2b$ of the transistor 2. The other terminal 9 of the mercury switch unit 7 is connected to the emitter electrode $2e$.

The series circuit arrangement of the switch unit 7 and the collector-base path $2cb$ of the transistor 2 is provided with a substantially small alternating current from the source of supply voltage 3; the terminal 5 of said supply voltage source being connected to the collector electrode $2c$ of said transistor through the diode 6 and the heater winding 1 and the terminal 4 of said supply voltage source being connected to the terminal 9 of said switch unit. The terminal 4 of the supply voltage source is also connected to the emitter electrode 2e. A bias resistor 10 is connected between the base electrode 2b and a point common to the heater winding 1 and the diode 6.

FIG. 2 is a schematic diagram of a modification of the embodiment of FIG. 1. In FIGS. 1 and 2, the same reference numbers identify circuit components which are the same in both figures. The difference between the embodiments of FIGS. 1 and 2 is that FIG. 2 utilizes a PNP type transistor instead of the NPN type transistor utilized in FIG. 1. This requires that the diode 26 of FIG. 2 be connected in the reverse conduction direction from that of the diode 6 of FIG. 1.

If the entire circuit arrangement of FIG. 2 were to consist only of the heater winding 1, the transistor 22 and the supply voltage source 3, assuming that the electrodes were to be properly biased and that said transistor is of the PNP type, said transistor would be conductive upon the voltage at the emitter electrode being positive with respect to that at the collector electrode and that at the base electrode and the voltage at the collector electrode being negative with respect to that at the base electrode and the heater winding 1 would produce heat due to the current flow therethrough. In other words, the PNP type transistor conducts when there is a negative voltage from the collector to base and a positive voltage from the emitter to base.

FIG. 3 is a schematic diagram, partly in section, illustrating the physical positions of some of the components of FIGS. 1 and 2. In a preferred embodiment of the invention, the heater winding 1 and the switch unit 7 are positioned in an oven unit 31 and said heater winding is placed in close proximity to said switch unit. The oven unit 31 may comprise any suitable type of oven having desirable temperature isolating characteristics, such as, for example, a crystal oven.

The temperature control circuit arrangement of the present invention operates on a small alternating current voltage, of for example, 6.3 volts, to maintain a temperature constant to within $\pm 0.01$ degree centigrade at a fixed ambient and to within $\pm 0.01$ degree centigrade over the ambient operating range.

The circuit arrangement of the present invention delivers power to the heater winding 1 when the switch unit 7 is open, or in its OFF position, and shuts off the power delivered to said heater winding when said switch unit is closed, or in its ON position. The power handled by the switch unit 7 is at a minimum and thereby insures a long reliable switch life. The control operation is executed with an A.C. source 3, of preferably 6.3 volts, to avoid the need for a special power supply requiring filters and other components. The utilization of an A.C. power source results in circuit operation during alternate half cycles.

The transistor may be compared to two diodes; emitter-base $eb$ and collector-base $cb$. The diode $eb$ functions as a low power portion and causes current to flow in the high power portion $cb$ when the first-mentioned diode is activated or energized. Since a transistor is a polarized device, provision must be made to protect the $cb$ diode portion which normally functions with reverse bias. This is achieved by the diode 6, which protects the diode portion $2cb$ from forward conduction, and by the diode 26, which protects the diode portion $22cb$.

Although either PNP type transistors or NPN type transistors may be utilized in the circuit arrangement of the present invention, a PNP type transistor, as illustrated in FIG. 2, is assumed in the following description of the circuit operation.

When the oven temperature is less than the predetermined value, the mercury in the switch unit 7 functions in a known manner to open the circuit through said switch unit and the said switch unit is non-conductive in its OFF position. During the half cycle when the terminal 5 is negative and the terminal 4 is positive, the transistor 22 provides a conductive path through its emitter-base $22eb$ circuit. The circuit includes components 4, $22e$, $22b$, 10, 26 and 5. The current through the diode portion $22eb$ during this period is approximately $$V4-5/R_{10}+R_{26}+R_{22eb}$$

which is a very low value.

Activation or energization of the diode portion $22eb$ makes $22ec$ conductive and current flows through a circuit including components 4, $22e$, $22c$, 1, 26 and 5. The last-mentioned current is approximately $$V4-5\beta22/R_1+R_{26}+R_{22ec}$$

where $\beta22$ is the circuit gain of the transistor 22, a number much greater than 1. When current flows through the heater winding 1, said winding produces heat and the oven temperature rises.

During the next half cycle, the terminal 5 is positive and the terminal 4 is negative and no current flows in the circuit including components 5, 26, 1 $22c$, $22b$, $22e$, 4 due to the blocking action of the diode portion $22eb$ at this polarity. Similarly, there is no current flow in the circuit including components 5, 26, 10, $22b$, $22e$ and 4 due to the blocking action of the diode portion $22eb$. The blocking action is abetted in both circuits by the blocking action of the diode 26.

Thus, during alternate half cycles the heat-producing heater winding 1 warms up and heats the switch unit 7, until at a predetermined temperature said switch unit closes the circuit therethrough and conducts current in its ON position. Of course, when the oven temperature exceeds a predetermined value, which is preferably the desired oven temperature, for any reason, the mercury in the switch unit 7 functions to close the circuit through said switch unit and conducts current in its ON position.

When the switch unit 7 is in its ON position, during the half cycle when the terminal 5 is negative and the terminal 4 is positive, virtually no current can flow through the emitter-base path $22eb$ since $22b$ and $22e$ are then at the same potential. Therefore, the current in the diode portion $22eb$ is negligible and the current in the heater winding 1 is very small.

During the next half cycle, the terminal 5 is positive and the terminal 4 is negative. The current in the emitter-base path $22eb$ is cut off because of the polarity of said path and the collector path is protected by the diode 26 as previously described. The heater winding 1 and switch unit 7 then cool until said switch unit reopens and the operation is repeated.

The circuit arrangement of the present invention provides great reliability of performance because the switch unit 7 has an excellent "memory" and it has a long life due to the resistive load on said switch unit and the low current flow in the circuit.

The circuit arrangement of the present invention will perform with D.C. if the terminal 5 is negative and the terminal 4 is positive in FIG. 2, and if the terminal 5 is positive and the terminal 4 is negative in FIG. 1. In such case, the diode (26 or 6) is not necessary.

FIG. 4 represents heat flow lines and equal or constant temperature shells or surfaces. The dotted lines in FIG. 4 represent an imaginary series of constant temperature surfaces $a$, $b$, $c$, $d$ which are perpendicular to the lines of heat flow. The constant temperature surfaces may be considered as surrounding the heater winding 1. The mercury switch 7 is on one such constant temperature surface, such as, for example, $c$ and a controlled space S is on one such constant temperature surface, such as, for example, $b$.

FIGS. 5A, 5B and 5C represent gradient conditions with change of ambient temperature for various relative positions of the heater winding 1, the controlled space S and the mercury switch 7. That is, FIGS. 5A, 5B and 5C illustrate how relative positions of the heater winding 1, the controlled space S and the mercury switch 7 affect the temperature of the controlled space S with respect to ambient temperature variations. In FIG. 5A, the controlled space S has a higher temperature than the mercury switch 7. At a given ambient temperature T1 a certain amount of heat flows through the mercury switch shell. The product of this heat flow and the thermal impedance between the mercury switch 7 and ambient is the temperature drop T–T1. If the ambient temperature changes to T2, the heat flow must change, since the thermal impedance does not change. The heater winding temperature must therefore change, with an accompanying proportional change in temperature of the controlled space S. In this case, as the ambient temperature rises, the controlled space temperature falls. Similar considerations apply to FIG. 5B except that, as the ambient temperature rises, the controlled space temperature rises. If the controlled space is brought to the temperature of the mercury switch 7 there should be no change in the temperature of the controlled space until changes in ambient temperature occur. (FIG. 5C.)

FIG. 6 graphically illustrates the incremental temperature change ΔT versus relative position of the mercury switch 7 with respect to the heater winding 1. In FIG. 6, the controlled space S temperature is measured at a first ambient temperature T1 for different relative positions of the mercury switch with respect to the heater winding 1 and the controlled space S. The controlled space S temperature is measured at a second ambient temperature T2 for different relative positions of the mercury switch with respect to the heater winding 1 and the controlled space S. At the point of intersection X of the two curves there is no temperature change with respect to ambient conditions, so that the mercury switch 7 is preferably positioned at the distance X from the heater winding for optimum performance.

While the invention has been described by means of specific examples and in specific embodiments, we do not wish to be limited thereto, for obvious modifications will occur to those skilled in the art without departing from the spirit and scope of the invention.

What we claim is:

1. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a heating winding adapted to heat said oven arrangement and connected in series circuit arrangement with the emitter-collector path of said transistor, means for applying a voltage across said series circuit arrangement, and heat sensitive switching means positioned in said oven arrangement and connected across the emitter-base path of said transistor for controlling the conductive condition of the said transistor and therefore the energization condition of said heating winding in accordance with the temperature of a selected area in said oven arrangement whereby the temperature of said oven arrangement is controlled with great precision.

2. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a heating winding adapted to heat said oven arrangement and connected in series circuit arrangement with the emitter-collector path of said transistor, means for applying a voltage across said series circuit arrangement, and heat sensitive switching means positioned in said oven arrangement and connected across the emitter-base path of said transistor and across said voltage applying means for controlling the conductive condition of the said transistor and therefore the energization condition of said heating winding in accordance with the temperature of a selected area in said oven arrangement whereby the temperature of said oven arrangement is controlled with great precision, said heat sensitive switching means being adapted to close a circuit across said emitter-base path of said transistor and across said voltage applying means thereby to make said transistor non-conductive and deenergize said heating winding when the temperature of said oven arrangement rises above a predetermined temperature.

3. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a heating winding adapted to heat said oven arrangement and connected in series circuit arrangement with the emitter-collector path of said transistor, means for applying a voltage across said series circuit arrangement, and heat sensitive switching means positioned in said oven arrangement in spaced relation from said heating winding at a predetermined distance from said heating winding at which there is substantially no temperature change with respect to ambient temperature conditions, said heat sensitive switching means being connected across the emitter-base path of said transistor and across said voltage applying means for controlling the conductive condition of the said transistor and therefore the energization condition of said heating winding in accordance with the temperature of a selected area in said oven arrangement whereby the temperature of said oven arrangement is controlled with great precision.

4. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a heating winding adapted to heat said oven arrangement and connected in series circuit arrangement with the emitter-collector path of said transistor, means for applying a voltage across said series circuit arrangement, and heat sensitive switching means positioned in said oven arrangement in spaced relation from said heating winding at a predetermined distance from said heating winding at which there is substantially no temperature change with respect to ambient temperature conditions, said heat sensitive switching means being connected across the emitter-base path of said transistor and across said voltage applying means for controlling the conductive condition of the said transistor and therefore the energization condition of said heating winding in accordance with the temperature of a selected area in said oven arrangement whereby the temperature of said oven arrangement is controlled with great precision, said heat sensitive switching means being adapted to close a circuit across said emitter-base path of said transistor and across said voltage applying means thereby to make said transistor non-conductive and deenergize said heating winding when the temperature of said oven arrangement rises above a predetermined temperature.

5. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a rectifier, a heating winding adapted to heat said oven arrangement and connected in series circuit arrangement with said rectifier and the emitter-collector path of said transistor, means for applying an alternating voltage across said series circuit arrangement, and heat sensitive switching means positioned in said oven arrangement and connected across said transistor for controlling the conductive condition of the said transistor and therefore the energization condition of said heating winding in accordance with the temperature of a selected area in said oven arrangement whereby the temperature of said oven arrangement is controlled with great precision.

6. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a rectifier, a heating winding adapted to heat said oven arrangement and connected in series circuit arrangement with said rectifier and the emitter-collector path of said transistor, means for applying an alternating voltage across said series circuit arrangement, and heat sensitive switching means positioned in said oven arrangement and connected across the emitter-base path of said transistor and between a point common to said transistor and said voltage applying means and a point common to said heating winding and said rectifier for controlling the conductive condition of the said transistor and therefore the energization condition of said heating winding in accordance with the temperature of a selected area in said oven arrangement whereby the temperature of said oven arrangement is controlled with great precision.

7. An oven arrangement comprising, in combination, a transistor having emitter, collector and base electrodes, an emitter-base path between an emitter and base electrode thereof, an emitter-collector path between an emitter and collector electrode thereof and a collector-base path between a collector and base electrode thereof, a rectifier, a heating winding adapted to heat said oven arrangement and connected in series circuit arrangement with said rectifier and the emitter-collector path of said transistor, means for applying an alternating voltage across said series circuit arrangement, and heat sensitive switching means positioned in said oven arrangement in spaced relation from said heating winding at a predetermined distance from said heating winding at which there is substantially no temperature change with respect to ambient temperature conditions, said heat sensitive switching means being connected across the emitter-base path of said transistor and between a point common to said transistor and said voltage applying means and a point common to said heating winding and said rectifier for controlling the conductive condition of the said transistor and therefore the energization condition of said heating winding in accordance with the temperature of a selected area in said oven arrangement whereby the temperature of said oven arrangement is controlled with great precision.

References Cited by the Examiner

UNITED STATES PATENTS

| | | | |
|---|---|---|---|
| 1,996,569 | 4/1935 | Byrnes et al. | 219—210 |
| 2,932,714 | 4/1960 | Merrill | 219—501 |
| 2,975,260 | 3/1961 | Carlson | 219—501 |
| 3,068,338 | 12/1962 | Bigler | 219—501 |

RICHARD M. WOOD, *Primary Examiner.*

MAX L. LEVY, WALTER STOLWEIN, *Examiners.*